Figure 1:
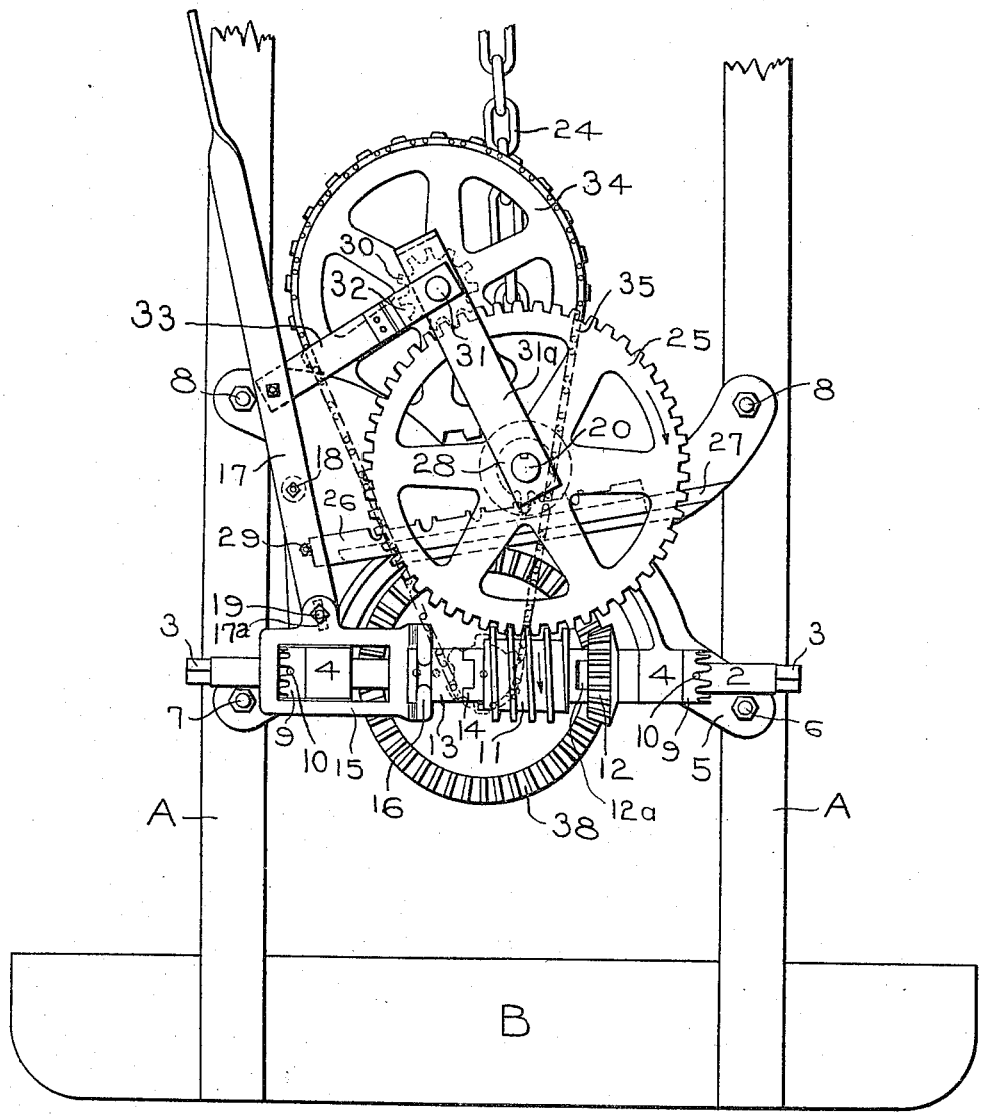

G. B. READ.
GEARING.
APPLICATION FILED JULY 22, 1912.

1,170,460.

Patented Feb. 1, 1916.
3 SHEETS—SHEET 1.

WITNESSES

INVENTOR
Geo. B. Read
BY
ATTY.

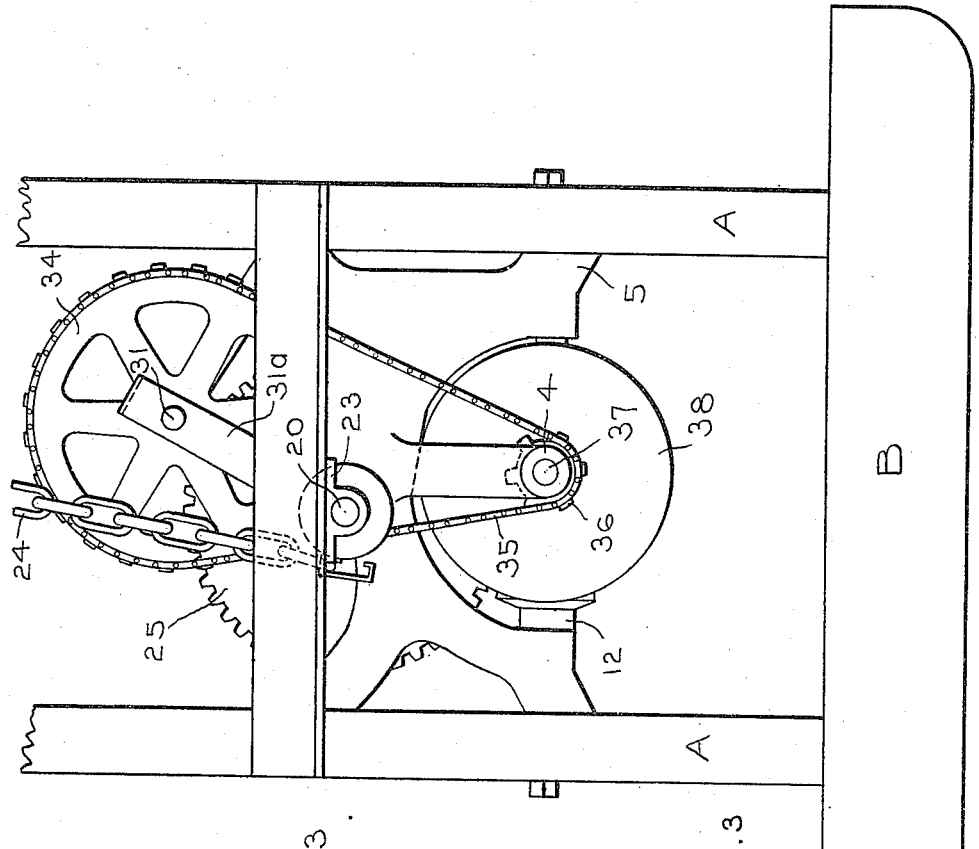
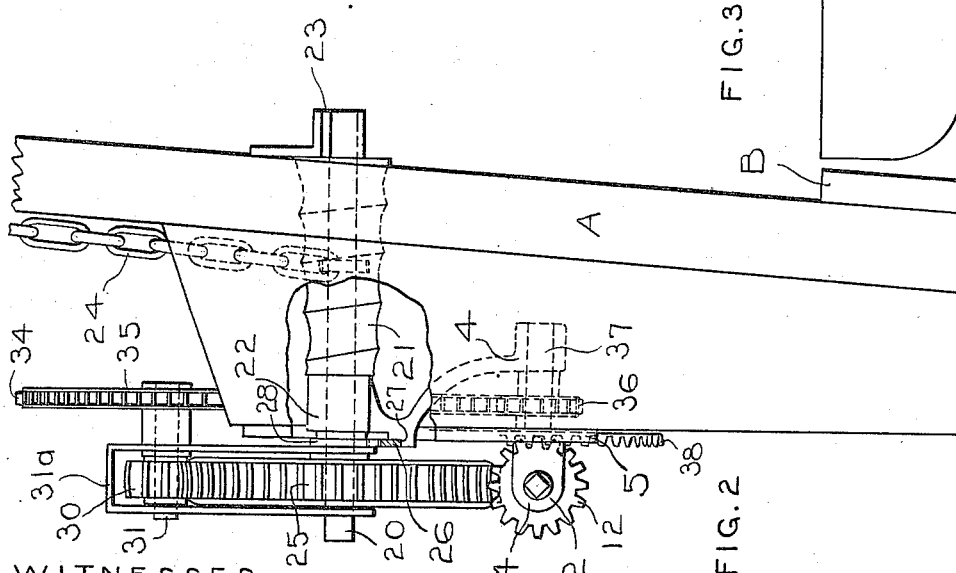

G. B. READ.
GEARING.
APPLICATION FILED JULY 22, 1912.
1,170,460.
Patented Feb. 1, 1916.
3 SHEETS—SHEET 3.
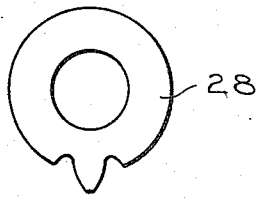
FIG. 4
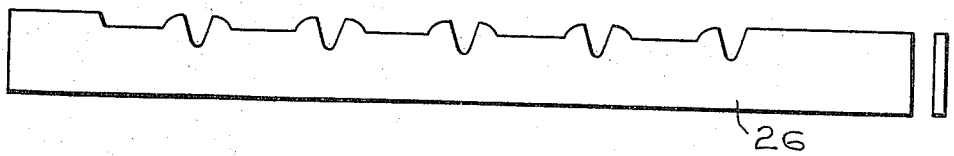
FIG. 5
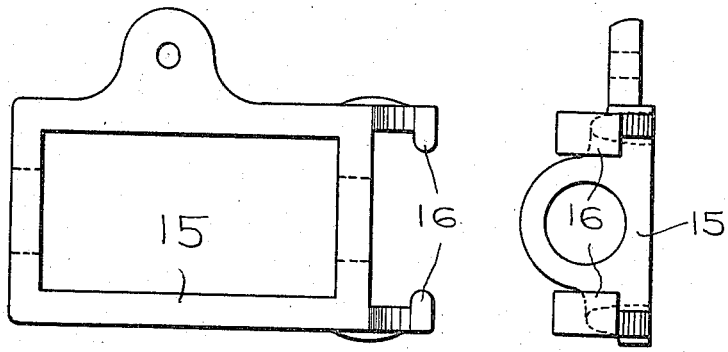
FIG. 6
FIG. 7
WITNESSES
INVENTOR
BY
ATTY.

UNITED STATES PATENT OFFICE.

GEORGE B. READ, OF BLOOMINGTON, ILLINOIS.

GEARING.

1,170,460. Specification of Letters Patent. Patented Feb. 1, 1916.

Application filed July 22, 1912. Serial No. 710,793.

*To all whom it may concern:*

Be it known that I, GEORGE B. READ, a citizen of the United States, residing at Bloomington, in the county of McLean and State of Illinois, have invented certain new and useful Improvements in Gearing; and I do hereby declare that the following is a full, clear, and exact description of the invention, which will enable others skilled in the art to which it appertains to make and use the same.

My invention relates to wagon dumps.

More particularly, my invention relates to operative mechanism involved in the raising and lowering of a wagon and in practice, I have made special application of the device to a wagon dump used upon the farm in handling grain.

The object of my invention is to provide an efficient raising means, and especially to provide means for controlling the gravity descent of the wagon.

My invention consists essentially of mechanically connected parts adapted to raise a loaded vehicle and a portion of the same means and auxiliary parts correlated to act connectedly to brake against the descent of the wagon through the normal friction of the parts when actuated under the gravity pull of the wagon.

That my invention may be more fully understood, reference is had to the accompanying drawings, in which—

Figure 1 is a front view showing a part of the framework of what is called an overhead dump, with my device attached; Fig. 2 is a side elevation of my device connected to the dump framing; Fig. 3 is a view from the opposite side of that shown in Fig. 1, and showing my device attached to the dump framing; Fig. 4 is a detail view of a unit spur wheel; Fig. 5 is a detail view of a cog rack; Fig. 6 is a plan view of a clutch shifting frame, and Fig. 7 is an end view of the same frame disclosed in Fig. 6.

It has been found impractical to utilize raising means whether it be screw or gear connection, alone, to brake against the gravity descent of a wagon. Likewise, specially designed friction devices for the purpose are difficult to control and to keep in working condition, and I have discovered that I am able to utilize a portion of the raising mechanism, and by auxiliary connections shifted into connected relation and a portion of the raising connection out of operation, I am able, by proportioning the parts, to control the descent of the wagon absolutely at any speed desired, thereby producing a mechanism that is cheap and durable, and efficient under all circumstances of use.

Referring to the drawings, A refers to uprights and B to the base of one section of an overhead dump or jack showing my devices attached. However, the mechanism may be connected and associated with what is called a low down dump or jack as well, if desired.

Referring now particularly to the raising mechanism, 2 is a shaft squared at both ends as at 3 and is adapted in practice to be connected to be driven from either end, as desired and from any suitable power, as for instance, the tumbling rod of a horsepower or connection with an elevator shaft of a dump and elevator which derives its power from a horse power or other suitable power. Shaft 2 and other parts are supported in suitable boxings as 4 in a cast frame 5 connected to the framing as at 6, 7 and 8, and is held from longitudinal movement therein by means of the serrated caps 9 and pins 10 in the common and well known manner.

11 is a worm normally loose on shaft 2.

12 is a bevel gear likewise normally loose on shaft 2, there being provided the common shoulder and slot connection between the worm and bevel gear as at 12$^a$.

13 is a clutch sleeve adapted to be splined on shaft 2 and is adapted to be alternately engaged with clutch part 14 on worm 11 and to be disengaged therefrom.

15 is a framing in form best shown in Figs. 6 and 7 adapted to be supported on shaft 2, and is provided with inturned fingers 16 engaging a runway circumferentially of clutch 13.

17 is a lever pivoted intermediate its ends as at 18 and is connected with clutch shifting frame 15 as at 19. Manipulation of lever 17 will effect a connection or disconnection of worm 11 with shaft 2 to render the same fast or loose thereon as may be desired, said lever being slotted as at 17$^a$ to compensate for the varying distance between the fulcrum point of the lever and its connection with clutch frame 15.

20 is a winding shaft carrying a spiral drum 21 fixed thereon, said shaft being supported in boxing 22 in cast frame 5 and in boxing 23 on a portion of framing A. A chain as 24 is adapted to be connected at one of its ends to drum 21 and its other end to work in conjunction with parts adapted to be connected to the wheels or other part of a wagon.

25 is a worm wheel fixed upon shaft 20 and in the raising operation is adapted for engagement with and to be operated by worm 11.

To effect the raising operation, clutch 13 is adapted to be shifted to engage worm 11, and the latter being driven in the proper direction will serve to drive worm wheel 25 and with it shaft 20, to which it is fixed, resulting in chain 24 being wound upon drum 21 causing the wagon to be raised.

For the purpose of limiting the upward movement of the wagon, I have provided the rack bar 26 supported in slideway 27 upon the body of cast frame 5 and the unit spur wheel 28 fixed on shaft 20. The notches in cog rack 26 are properly spaced apart for working in conjunction with unit spur 28 to effect a gradual projection of the rack toward lever 17 until it shall engage stop 29 on said lever at a point below its fulcrum and will effect the disengagement of clutch 13 from worm 11, thereby discontinuing the raising operation and the load will be held in suspension under the lock of worm wheel 25 upon worm 11, the pitch of the worm being such as to prevent backward turning under the weight of the load. Obviously, the raising operation can be stopped at any point by the manual operation of lever 17.

To accomplish the controlled descent of the wagon under the friction brake of the connected mechanism, I have provided mechanism for shifting the load from the worm and for driving the worm in advance and in clearance from the teeth of worm wheel 25. The mechanism for accomplishing this purpose comprises cog wheel 30 on short shiftable shaft 31 carried in bracket 32 and journaled in a pair of bars 31a, their lower ends being journaled on shaft 20, said bracket being connected by means of arm 33 with lever 17 above its fulcrum point. This connection enables shaft 31 to be shifted so that the cogs of cog wheel 30 may occupy different positions relative to the teeth of worm wheel 25.

34 is a sprocket wheel fixed on shaft 31 and is connected by means of sprocket chain 35 with sprocket wheel 36 (see Figs. 2 and 3) loose on stub shaft 37 which latter is fixed in boxing 4 of casting 5.

38 is a bevel gear, the same being integrally connected and forming one body with sprocket wheel 36 and meshing with bevel wheel 12, the latter being normally loose on shaft 2, but operating in connection with worm 11 as shown.

In the operation of my device, when the worm 11 is driven from the power it turns in the direction of the arrow, resulting in the driving of worm wheel 25 in the direction shown by the arrow, serving to wind chain 24 upon drum 21 in the manner it is connected and purposed to be wound, as shown in Fig. 3. During such raising operation, there is a drive connection from worm 11 to wheel 25 and the position of cog wheel 30 with relation to wheel 25 is such that said cog wheel 30 and its connection back to bevel gear 12 run substantially idly.

The lowering operation is very simple and very effective. After the load has been discharged and it is desired to lower the wagon, lever 17 is shifted forwardly a short distance and its movement, through the connection of reach 33 with stub shaft 31, will shift cog wheel 30 to a position whereby its teeth engaging the teeth of worm wheel 25 will cause said cog wheel to rotate slightly, and through the sprocket wheels 34, 36, sprocket chain 35, and bevel gears 38, 12, the worm 11 will be turned sufficiently to free worm wheel 25, thereby releasing the support for the load and by gravity the wagon will descend, imparting a reverse turning to winding shaft 20 and corresponding reverse action of worm wheel 25, cog wheel 30, sprocket wheels 34 and 36, bevel gears 38 and 12, and worm 11 in clearance of worm wheel 25. Under normal conditions, the friction of the connected parts named is sufficient to control the descent of the wagon at the proper and desired speed. If, however, it is desired to check the speed, as it might be, if it were desired to lower the loaded wagon after it were raised, or if an unusually heavy wagon were employed, it may be accomplished by a slight additional forward movement of lever 17 which will serve to throw the teeth of worm wheel 25 into any degree of frictional engagement desired against the face of the worm opposite that of its normal bearing, or as is generally the practice the lever may be shifted in the opposite direction to cause any degree of frictional bearing that is desired against the face of the worm that normally serves as the driving face and stop.

I have shown herein one form of embodiment of my invention but realizing that other forms of embodiment may be employed to effect the purpose, I therefore do not desire to limit myself to the form and particular arrangement of parts disclosed, but claim as my invention all forms of embodiment that fall legitimately within the principle thereof.

What I claim is:

1. In a gearing for wagon dumps, a frame structure, a driven shaft, a drive shaft, a worm on the drive shaft, a worm wheel driven therefrom connected with the driven shaft and normally in engagement with the worm, means for shifting the worm and including means for turning the same in clearance of the worm wheel to permit the driven shaft to turn freely in reverse direction.

2. In a gearing for wagon dumps, a frame structure, a driven shaft supported therein, a drive shaft, a worm thereon, a worm wheel on the driven shaft adapted to be driven from the worm and means for shifting the worm out of engagement with the worm wheel and including means for turning the worm in clearance of the worm wheel to permit the reverse rotation of the driven shaft.

3. In a gearing for wagon dumps, in combination, a frame structure, a reversible driven shaft supported in connection therewith, a drive shaft, a worm thereon, a worm wheel upon the driven shaft normally in engagement with the worm and adapted to be driven to rotate the driven shaft in one direction, means connected with the worm wheel for shifting the worm including means actuated by the reverse rotation of the driven shaft to turn the worm in clearance of the worm wheel.

4. In a gearing for wagon dumps, in combination, a frame structure, a reversible driven shaft, a drive shaft, a worm thereon, a worm wheel upon the driven shaft normally in engagement with the worm, means for shifting the worm relative to the worm wheel to relieve the normal braking force therebetween and connecting means between the driven and the drive shaft independent of the worm, operable by the reverse rotation of the driven shaft to turn the worm in substantial clearance of the worm wheel.

5. In a gearing for wagon dumps, in combination, a frame structure, a reversible driven shaft, a drive shaft, a worm thereon, a worm wheel connected with the driven shaft and normally engageable by the worm to turn the driven shaft, related shiftable members engageable with the worm to turn it initially substantially in clearance of the worm wheel and operable through the reverse movement of the driven shaft to maintain such clearance.

6. In a gearing for wagon dumps, in combination, a frame structure, a reversible driven shaft, a drive shaft, a worm thereon, a worm wheel on the driven shaft engageable by the worm to effect a movement of the driven shaft in one direction, mechanism independent of the worm connecting the driven and drive shafts and means for shifting the said mechanism to effect clearance between the worm and worm wheel to relieve the braking force therebetween and permit a reverse movement of the driven shaft and to turn said worm through the reverse movement of said driven shaft during the period of such reverse movement.

7. In a device of the class described, a worm, a driven shaft, a worm wheel engageable with the worm, means for shifting the worm initially to relief position relative to the worm wheel including mechanism connecting the driven shaft with the worm to turn the latter in substantial clearance of the worm wheel to facilitate a reverse movement of the driven shaft.

8. In a device of the class described, a worm, a driven shaft, a worm wheel engageable with the worm, means for shifting the worm initially to relief position relative to the worm including gear connections between the driven shaft and the worm operable to turn the latter from the former to permit the reverse movement of the driven shaft.

9. In a device of the class described, in combination, a suitable frame structure, a driven shaft, a worm, a worm wheel on said shaft driven from said worm during the movement of the shaft in one direction, gear connections from said shaft independent of the worm to reversely turn the latter, a shiftable member connected with said gear connection between said driven shaft and said worm to shift the latter in initial relief of the worm wheel whereby the driven shaft is free to reversely rotate.

10. In a device of the class described, in combination, a suitable framing, a driving shaft and a driven shaft thereon, a worm gear normally loose on the drive shaft, a worm wheel on the driven shaft in engagement with the worm during the movement of the shaft in one direction, a shiftable auxiliary gear connection between the driven shaft and the worm adapted to release the worm wheel from its engagement with the worm and to turn the worm in clearance of the worm wheel.

11. In a device of the class described, in combination, a suitable framing, a driving and a driven shaft thereon, a worm gear normally loose on the drive shaft, a worm wheel on the driven shaft in engagement with the worm during the movement of the driven shaft in one direction, a shiftable auxiliary gear connection between the driven shaft and the worm adapted to release the worm wheel from its engagement with the worm and to turn the worm in clearance of said worm wheel, and means for shifting the auxiliary gear connection between the worm wheel and the worm.

12. In a device of the class described, the combination of a train of gearing including a worm and a worm wheel normally in locked relation, and means operable during the operation of the train of gearing for angularly advancing or retracting the worm with reference to the worm wheel to control the operation of the latter.

13. In a device of the class described, the combination of a train of gearing including a worm and worm wheel having a normal locking relation and means for changing the operative relation of said worm and worm wheel during operation, whereby said worm and worm wheel members may be correlated for driving and braking relation or may be separated for reverse movement and driven in clearance respectively each of the other.

14. In a device of the class described, the combination of a train of gearing including a worm and worm wheel, power operated means for driving the gearing in one direction, means for imparting a reverse movement to the gearing and means for changing the operative relation of the worm and worm wheel members for controlling the reverse movement thereof.

15. In a device of the class described, the combination of a train of gearing including a worm and worm wheel, power actuated means for driving the gearing in one direction, means for disconnecting the power actuated means, mechanism for imparting a reverse movement to the gearing and manually operable means for changing the operative relation of the worm and worm wheel members of the gearing during operation, whereby the worm wheel is operated by the reverse movement of the gear train so as to allow the gearing to operate.

16. In a device of the class described the combination of an operable member, a worm having a locking relation with the operable member, mechanism connected with the operable member for rotating the worm so as to allow the operable member to operate, and means for changing the relation of the worm, and operable member during operation so as to control the operation of the operable member.

17. In a device of the class described, the combination of a driven member, means for driving said member forwardly including a worm said worm having a frictional brake relation with the driven member, mechanism whereby the worm is operated by the driven member in its reverse movement and means for changing the friction relation of the worm and driven member to control the reverse operation of the latter.

18. In a device of the class described, the combination of a driven member, means for driving said member forwardly including a worm, said worm having a frictional brake relation with the driven member, and mechanism operated by the driven member in its reverse movement for driving the worm.

19. In a device of the class described the combination of a member adapted to be driven, driving mechanism adapted to operate said member in one direction, means for causing the member to operate in the reverse direction independent of the driving mechanism, and gearing operatively connected with the member, and having a frictionally engaged worm for regulating the reverse operation for the member.

20. In a device of the class described the combination of a driven member, a plurality of elements having a related and coincident operation with the driven member and means for adjusting the relation of said elements, so as to regulate the operation of the driven member.

21. In a device of the class described the combination of a driven member, primary gearing connected with the driven member, secondary gearing also connected with the driven member and with the primary gearing, and means for changing the operative relation of the gearing, to cause a frictional engagement of parts and control the operation of the driven member.

22. In a device of the class described, the combination of a driven member, means for driving said member including a worm, said worm having a normal locking relation with said driven member, mechanism operable through the reverse movement of the driven member to turn the worm reversely, and manually operable means for changing the relation of the worm and driven member during operation for controlling the speed of the reverse movement of the driven member.

23. In a device of the class described the combination of a driven member, power driven means for operating said member in one direction, including a worm having a locking relation with the driven member, means for operating the driven member in the reverse direction, means for disconnecting the driven member and the power for operating the same, mechanism whereby the worm is operated by the driven member in this reverse movement and manually operable means for changing the relation of the worm and driven member during operation for controlling the reverse operation of the driven member.

24. In a device of the class described the combination of a power element, a worm wheel, a worm driven from said power element having a locking relation with the worm wheel, gearing connecting the worm and worm wheel, means for disconnecting the power element from the worm, means for driving the worm wheel in the reversed direction and means for advancing or retarding the said gearing so as to vary the relation of the worm with the worm wheel in its reverse operation and control the reverse movement of the worm wheel.

25. In a device of the class described, the combination of a driven member, means including a worm for driving said member in a forward direction, said worm having a frictional brake relation with the driven member, and mechanism operated by the driven member in its reverse movement for driving the worm, the same means being operable to establish the braking relation between the worm and the driven member.

In testimony whereof I have affixed my signature in presence of two witnesses.

GEORGE B. READ.

Witnesses:
MARY E. COMEGYS,
W. V. TEFFT.

Copies of this patent may be obtained for five cents each, by addressing the "Commissioner of Patents, Washington, D. C."